Oct. 18, 1966   A. O. NOREHAD ET AL   3,279,453
COOKING TRAY
Filed Feb. 19, 1965
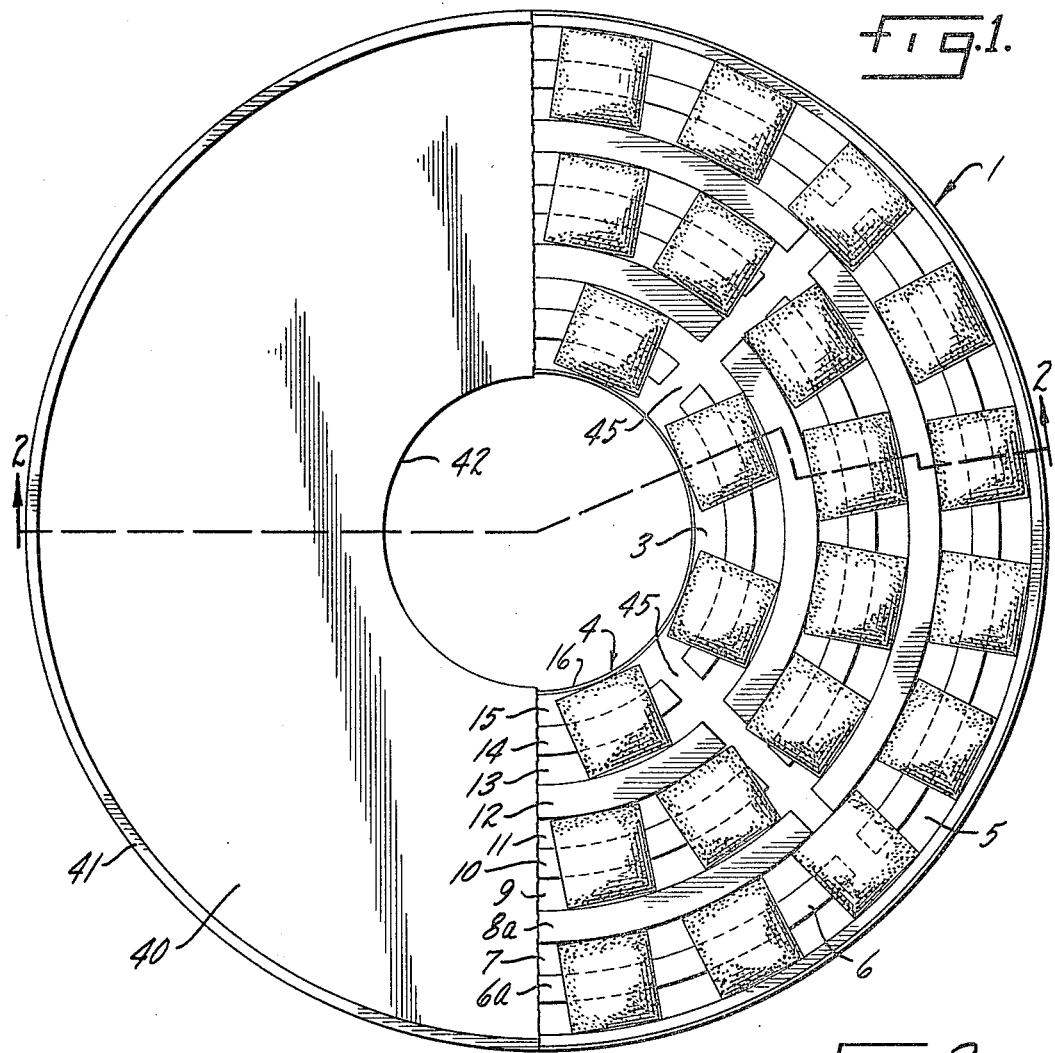
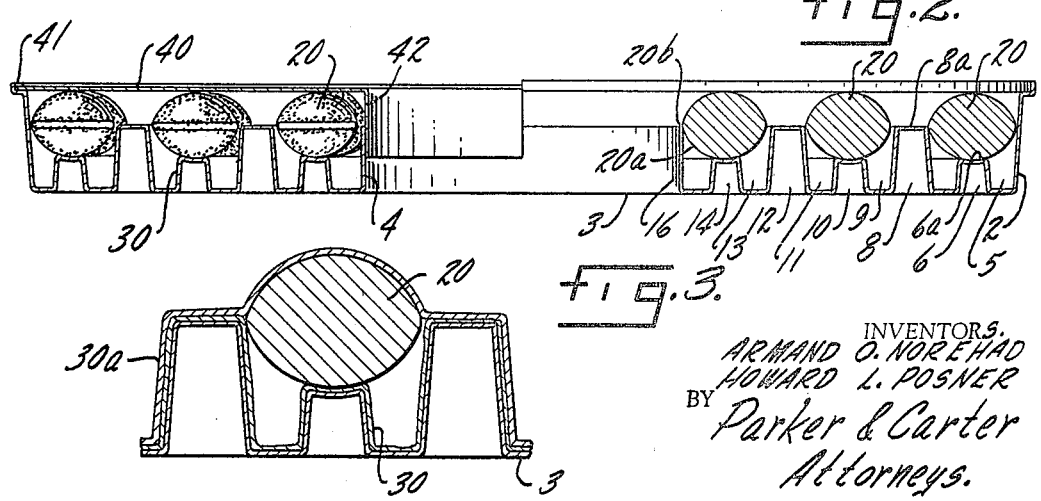
INVENTORS.
ARMAND O. NOREHAD
HOWARD L. POSNER
BY Parker & Carter
Attorneys.

United States Patent Office 3,279,453
Patented Oct. 18, 1966

3,279,453
COOKING TRAY
Armand O. Norehad, 1438 Kenilworth, Glenview, Ill., and Howard L. Posner, Skokie, Ill.; said Posner assignor to said Norehad
Filed Feb. 19, 1965, Ser. No. 434,061
20 Claims. (Cl. 126—25)

This invention relates to structures employable in cooking and heating and has particular relation to a product particularly useful with outdoor barbecue grills and the like.

One purpose of the invention is to provide a cooking tray having a uniform distribution of heat.

Another purpose is to provide a cooking tray having means for insuring rapid ignition of charcoal briquettes and the like associated therewith.

Another purpose is to provide a cooking tray having means effective to insure maximum supply of oxygen to charcoal briquettes and the like associated therewith.

Another purpose is to provide a cooking tray and coating therefor.

Another purpose is to provide a cooking tray having means effective to provide reservoirs for a flammable ignition substance.

Another purpose is to provide a cooking tray and coating therefor wherein said coating is effective to provide a flammable ignition substance and a means of positioning charcoal briquettes and the like associated therewith.

Another purpose is to provide a cooking assembly including a tray, a coating and a plurality of charcoal briquettes.

Another purpose is to provide a cooking tray having separably usable portions.

Another purpose is to provide a cooking tray having means for facilitating rapid dissemination of flame therethrough.

Another purpose is to provide a cooking assembly having heat-conductive elements.

Another purpose is to provide a cooking assembly having provision for heat convection.

Another purpose is to provide a cooking assembly having means for extinguishing the heat therein.

Another purpose is to provide a cooking assembly having means for facilitating rapid ignition thereof.

Another purpose is to provide a cooking assembly of maximum cleanliness in use and disposal.

Another purpose is to provide a cooking assembly effective to protect structures with which it is used.

Another purpose is to provide a cooking assembly of minimum cost in manufacture and maximum simplicity in use.

Another purpose is to provide a cooking assembly which shall be immediately ready for use and yet completely safe in shipment and handling prior to use.

Another purpose is to provide a cooking tray structure effective to accomplish all of the foregoing purposes.

Other purposes will appear from time to time during the course of the specification and claims.

The invention is illustrated more or less diagrammatically in the accompanying drawings wherein:

FIGURE 1 is a top plan view with a cover portion removed;

FIGURE 2 is a sectional view taken on the line 2—2 of FIGURE 1; and

FIGURE 3 is a detailed view on an enlarged scale of a variant form.

Like parts are indicated by like numerals throughout the specification and drawings.

Referring now to the drawings, and particularly to FIGURE 1, the numeral 1 generally designates a tray. While the tray 1 is shown as substantially circular in planar configuration, it will be understood that said configuration may take a variety of shapes without departing from the nature and scope of the invention. The tray 1 includes a peripheral outer wall 2, to a bottom edge of which is fixed a bottom wall 3. A central aperture 4 is formed in the bottom wall 3 in one form of the invention, the purpose of which will appear hereinbelow.

As will be noted from a view of both FIGURES 1 and 2, the bottom wall 3 has formed therein a plurality of alternating, arcuate grooves and ridges, said ridges being of alternating greater and lesser heights in relation to each other.

For example, a first groove 5 is formed adjacent and along the entire length of the wall 2. Adjacent and paralleling the groove 5 is a first ridge 6 of limited height. The upper surface 6a of ridge 6 is shown as concave. A second groove 7 is formed adjacent and parallels the ridge 6. A second ridge 8 of a height greater than that of ridge 6 is formed adjacent and parallel to the groove 7. The upper surface 8a of groove 8 is shown as straight or flat. Moving from groove 8 in a direction running from the wall 2 toward the central aperture 4, it will be observed that similar sets of grooves 9, 11, 13 and 15 are formed in the bottom wall 3 and ridges 10, 12 and 14 are similarly so formed, the ridges 10 and 14 corresponding in height to ridge 6 and the ridge 12 corresponding in height to ridge 8. An inner wall 16 forms a wall of groove 15 and defines the circular aperture 4 in the bottom wall 3. In the circular planar configuration illustrated herein, the grooves 5, 7, 9, 11, 13 and 15 and the ridges 6, 8, 10, 12 and 14 are all circular or arcuate and paralleling the circular outer wall 2 and inner wall 16. The inner wall 16 rises to the height of ridges 8 and 12.

Seated on the ridges 6, 10 and 14 is a plurality of spaced, long-burning members such as charcoal briquettes, those illustrated being circumferentially spaced on the circular tray 1. Each of the briquettes 20 has a curved bottom edge 20a for seating on the opposed, concave upper surfaces of the ridges 6, 10 and 14 and each of the opposite edges 20b of each briquette 20 is spaced apart a distance sufficient for contact, respectively, with the opposed upper edges of ridge 8 and wall 2, ridges 8 and 12 and ridge 12 and wall 16.

As may be best seen in FIGURE 3, the opposed walls of adjacent ridges are upwardly, outwardly inclined. Said inclination of said walls provides for ease of manufacture of the tray 1 in a single stamping step, the tray 1 being conveniently formed of relatively light aluminum, for example. While a variety of noninflammable materials may be employed in forming the tray 1, aluminum has been found particularly effective as described below.

It will also be observed, perhaps best in FIGURE 3, that the entire upper surface of the bottom wall 3, including the side walls of the grooves 5, 7, 9, 11, 13 and 15, as well as the upper surfaces 6a, 10a and 14a of ridges 6, 10 and 14 and the upper surfaces 8a and 12a of the ridges 8 and 12, is coated with a flammable substance indicated by the numeral 30. The substance 30 may be formed of a variety of compounds without departing from the nature and scope of the invention, it being understood that the substance 30 is such as to be readily ignitable by contact with the flame of a match, for example, and also be such as to burn at sufficiently high temperature to fully and rapidly ignite the long-burning members 20.

It has been found effective, for example, in forming the flammable compound 30 to employ a mixture of 50 percent by weight of microcrystalline wax of the paraffin group and of 50 percent by weight of a colorless, light petroleum distillate which has been refined to minimize the odor thereof. A suitable wax is that designated ML 445 and available from Sonneborn Chemical & Refining Corp. A suitable petroleum distillate is that designated "Deo-Base" and sold under said designation by said Sonneborn Chemical & Refining Corp.

Illustrated partially in FIGURES 1 and 2 is a cover 40, the outer edge of which conforms to the shape of the wall 2 for engagement with the upper edge thereof, the upper edge of wall 2 being bent or crimped inwardly in overlying locking engagement with the peripheral edge of the cover 40 as indicated at 41. When the planar configuration of the tray 1 includes a central aperture, the cover 40 has a depending, central, circular portion 42 defining a diameter substantially that of aperture 4, the wall 42 being of sufficient depended extension to provide for engagement with the inner surface of wall 16, as best seen in FIGURE 2, to insure airtight sealing of the area between walls 2 and 16 beneath cover 40. It will be understood that the upper edge of wall 16 may be crimped about the inner edge of such cover 40 without departing from the nature and scope of the invention.

A plurality of radially directed grooves, such as those indicated at 45 in FIGURE 1, are formed in the bottom wall 3 by interrupting the ridges 6, 8, 10, 12 and 14 in radially aligned paths, the purpose of which will appear hereinbelow.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, as shown in FIGURE 3, a second layer 30a of flammable material may overlie said first layer and may enclose briquettes 20 beneath cover 40.

The use and operation of the invention are as follows:

There is provided a cooking tray formed of nonflammable material and having an upwardly directed reflective surface, aluminum being found fully effective. The tray of the invention has conveniently formed therein a central aperture 4 to receive a central post commonly upstanding in various forms of portable outdoor grills. The tray may, of course, be used with a variety of grill structures without departing from the nature and scope of the invention.

The tray of the invention is provided with a perforation which substantially bisects the tray and cover thereby permitting alternate use of either the entire tray when the amount of food to be cooked so warrants, or a part of the tray when a lesser amount of food is to be cooked.

The cooking assembly of the invention is shipped and sold as a unitary closed member, providing for maximum sanitation. The flammable compound 30 may be formed of a variety of materials, those disclosed herein having been found preferable. A choice including volatile materials is permitted since cover 40 may be airtight, preventing deterioration thereof in storage. If a nonvolatile compound be employed, it will be realized that the cover 40 need not be airtight to provide extended shelf life of the product.

The user, having removed the cover 40 from either the entire or from a portion of the tray 1, sets the cover aside and places the tray beneath the grill which is to support the food during cooking. Thereafter the user simply ignites the material 30, an ordinary match being fully effective. The material 30 is readily ignitable and the flame produced thereby spreads rapidly throughout the tray, following the grooves 5, 7, 9, 11, 13 and 15, the radial grooves 45 being effective to spread the flame between the parallel arcuate grooves. Thus the tray may be ignited at any point therein. The material 30 is designed to burn at sufficiently high temperature to readily ignite the briquettes 20. The material 30, during the course of shipment, storage and prior to use, is of a tacky, adhesivelike nature such as to retain the briquettes, in cooperation with the cover 40, in the desired spaced position. Once the material 30 has been ignited the tray will not thereafter be moved and the briquettes will remain in place as the material 30 therebeneath burns. As the heating occurs and material 30 burns, it melts and flows downwardly along the walls of the grooves in the tray, the bottom portions of said grooves serving as reservoirs for the material 30 flowing thereinto. The material 30 thus carried in the lower portions of the grooves will, of course, continue to burn and to ignite the briquettes thereabove. The spaces created beneath the briquettes by the arcuate grooves and by the circumferential spacing of the briquettes in the tray insures full and adequate draft to the undersurface of the briquettes being heated by the flames of the burning material 30. Thus material 30 will be entirely consumed and the cooking assembly of the invention produces a bed of burning charcoal briquettes 20 in a minimum span of time and the user is enabled to begin the cooking operation within a minimum time interval after igniting material 30.

As the food is cooked, juices dropping therefrom are caught in the tray of the invention and the grill or stove is protected therefrom. The reflective surface of the tray aids in directing a maximum heat upwardly toward the food to be cooked.

When the food has been cooked and the point is reached at which the grill or other stovelike device is to be set aside, the briquettes 20 will have been substantially, if not entirely, consumed and will consist primarily, if not entirely, of ashes. The burnt briquettes and ashes will have remained in the tray and the grill or stove is free from effects thereof. The user replaces the cover 40 on the tray 1 or a portion of the cover 40 on the tray portion which has been used. Should there be unburned portions of the briquettes 20 remaining in the tray, the substantial deprivation of oxygen resulting from the replacement of the tray cover will facilitate a rapid deoxygenation thereof and a more rapid cooling of the cooking assembly.

The user may then simply discard the cooking assembly of the invention, or the portion thereof used. The enclosure of the burnt briquettes within the tray 1 and beneath the cover 40 insures against possible fire among the trash into which the used tray may be discarded. The tray and cover eliminate the need for tools to clean the grill or stove and the users' hands are never required to touch or be exposed to burnt briquettes or ashes.

It will be seen that the surface of the stove or other cooking structure with which the tray is used is protected against any contact with the briquettes 20 and that the necessity for cleaning such surface is eliminated.

There is claimed:

1. A cooking tray having a bottom surface and a peripheral wall, a plurality of upstanding ridges spaced on said bottom wall and defining grooves therebetween, said bottom surface being coated in its entirety with a flammable material, a plurality of charcoal briquettes seated upon said ridges and a cover engaging said peripheral wall and overlying said bottom surface and said briquettes.

2. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges.

3. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, said ridges defining a plurality of grooves in said bottom surface.

4. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, said ridges defining a plurality of grooves in said bottom surface, said grooves defining air spaces beneath said long-burning members.

5. A cooking assembly including a tray having a peripheral wall and a bottom surface joining said wall, a plurality of spaced ridges upstanding from said bottom surface within said wall, and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, said ridges defining a plurality of grooves in said bottom surface, said grooves having upwardly, outwardly inclined walls whereby said coating will flow into the lower portions of said grooves as said coating burns.

6. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, and a perforation substantially bisecting said tray.

7. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, and a cover engaging said wall and overlying substantially the entirety of said bottom surface.

8. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, and a cover engaging said wall and overlying substantially the entirety of said bottom surface, said cover engaging substantially all of said long-burning members.

9. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall.

10. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, a cover engaging said wall and overlying substantially the entirety of said bottom surface, and a perforation substantially bisecting said tray and cover.

11. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said bottom surface being heat-reflective.

12. A cooking assembly including a dishlike tray, the inner surface of said tray being heat-reflective, the inner surface of said tray being coated with a flammable material, a plurality of grooves and ridges formed in said inner surface, a plurality of long-burning members seated upon said ridges to provide air spaces in said grooves beneath said members, and a cover for said tray.

13. A cooking assembly including a dishlike tray, the inner surface of said tray being heat-reflective, the inner surface of said tray being coated with a flammable material, a plurality of grooves and ridges formed in said inner surface, a plurality of long-burning members seated upon said ridges to provide air spaces in said grooves beneath said members, said grooves including intersecting portions whereby migration of flame is facilitated when said material is burned, and a cover for said tray.

14. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, said ridges defining a plurality of grooves in said bottom surface, and a plurality of additional grooves interconnecting said first-named grooves.

15. A cooking assembly including a tray having a peripheral wall and a bottom surface joining said wall, a plurality of spaced ridges upstanding from said bottom surface within said wall and defining grooves therebetween, a flammable coating on substantially the entirety of said surface within said wall, a plurality of long-burning members seated in spaced relationship with each other on at least some of said ridges and within said wall, said long-burning members being in contact with said coating on the upper surface of said last-named ridges, said ridges defining grooves in said bottom surface, said grooves being of sufficient depth to provide air space beneath said long-burning members to serve as a reservoir receiving said coating as the same burns.

16. A cooking assembly including a dishlike tray, the inner surface of said tray being heat-reflective, the inner surface of said tray being coated with a flammable material, a plurality of grooves and ridges formed in said inner surface, a plurality of long-burning members seated upon said ridges to provide air spaces in said grooves beneath said members, a cover for said tray, and a central aperture in said tray.

17. A cooking assembly including a tray formed of nonflammable material, the normally upper surface of said tray being heat-reflective, a flammable coating on said surface, said surface having conformations defining grooves, upstanding elements on said surface adjacent said grooves, a plurality of long-burning members spaced on said surface and supported by said elements, and a cover closing said tray and enclosing said members between said tray and cover.

18. A cooking assembly including a nonflammable tray, a flammable coating on the inner surface of said tray, a plurality of long-burning members spaced within said tray and upon said coating and a second flammable coating on said first coating and said long-burning members.

19. A cooking assembly including a nonflammable tray, a flammable coating on the inner surface of said tray, a plurality of long-burning members spaced within said tray and upon said coating and a cover closing said tray, a central aperture in said tray and cover and a perforation substantially bisecting said tray and cover.

20. A cooking assembly including a nonflammable tray, a fast-burning coating on the inner surface of said tray, a plurality of slow-burning members spaced within said tray and upon said coating, a second fast-burning coating on said first coating and said slow-burning members, and a cover closing said tray.

References Cited by the Examiner
UNITED STATES PATENTS

| | | | |
|---|---|---|---|
| 2,918,051 | 12/1959 | Broman | 126—25 |
| 2,981,249 | 4/1961 | Russell et al. | 126—25 |
| 3,089,760 | 5/1963 | Jaffe | 44—41 |
| 3,191,591 | 6/1965 | Bennett | 126—25 |

FREDERICK L. MATTESON, JR., *Primary Examiner.*

E. G. FAVORS, *Assistant Examiner.*